United States Patent [19]
Conde

[11] 3,854,561
[45] Dec. 17, 1974

[54] UNIDIRECTIONAL SLIP CLUTCH

[75] Inventor: Hector O. Conde, El Cerrito, Calif.

[73] Assignee: The United States of America as represented by the Secretary of the Department of Health, Education and Welfare, Washington, D.C.

[22] Filed: May 9, 1973

[21] Appl. No.: 358,610

[52] U.S. Cl............... 192/48.92, 192/45, 64/30 C
[51] Int. Cl...................... F16d 47/04, F16d 41/07
[58] Field of Search................ 192/48.3, 48.92, 45; 64/30 R, 30 C

[56] References Cited
UNITED STATES PATENTS

| 609,973 | 8/1898 | Neeley | 192/45 |
|---|---|---|---|
| 1,323,850 | 12/1919 | Fisher | 64/30 |
| 2,055,803 | 9/1936 | Rafter | 64/30 X |
| 2,792,792 | 5/1957 | Seewer | 192/45 X |
| 3,251,442 | 5/1966 | Aschauer | 192/48.92 X |
| 3,767,019 | 10/1973 | Wingler | 192/45 |

Primary Examiner—Allan D. Herrmann

[57] ABSTRACT

A mechanical clutch which provides a solid connection between a shaft and a cylinder mounted thereon when the shaft rotates in one direction, while assuming a slipping configuration after attaining a predetermined torque when the shaft rotates in the opposite direction. A disc-shaped means is carried by the shaft within the cylinder, the disc-shaped means having a plurality of peripherally spaced grooves arranged in the circumference thereof, each of which has a shallow end and a deep end, with a ball received in each groove. When the shaft rotates in one direction, the balls contact the cylinder, thus providing a solid connection, while the balls fail to contact the cylinder when the shaft rotates in the opposite direction. However, an adjustable spring is provided to preclude relative rotation between the shaft and cylinder, i.e., slippage, until the spring pressure is overcome.

2 Claims, 6 Drawing Figures

PATENTED DEC 17 1974 3,854,561

UNIDIRECTIONAL SLIP CLUTCH

BACKGROUND AND SUMMARY OF THE INVENTION

The present invention relates to a mechanical clutch. More particularly, the present invention is concerned with a mechanical clutch which provides a solid connection when rotating in one direction but which will slip when rotating in the opposite direction, upon the attainment of a predetermined torque.

Conventional mechanical clutches include those which operate by having the braking surfaces pressed against each other by biasing means such as a spring. Adjustment means is usually provided to allow the tension upon the spring to be increased or reduced.

Other clutches which are known in the prior art will act as a slipping clutch when rotating in one direction, but will become completely disengaged when rotating in the opposite direction.

By the present invention there is provided a mechanical clutch having the feature that a solid connection is provided between the rotating members when the clutch is rotating in one direction, while the clutch will slip when rotating in the opposite direction, upon the attainment of a predetermined torque.

The clutch of the present invention includes a rotatable shaft with a cylinder mounted in bearings on the shaft so that the cylinder may rotate freely with respect to the shaft. A disc-shaped means is carried by the shaft within the cylinder, the disc-shaped means having a diameter which is slightly less than the inner diameter of the cylinder. A plurality of peripherally spaced depressions or grooves is located on the circumference of the disc-shaped means, and a ball is received in each of the grooves. Each groove has a shallow end and a deep end so that, as the shaft is rotated in one direction, the ball in each groove moves to the deep end of the groove with the result that the balls do not come in contact with the inner wall of the cylinder. However, when the shaft is rotated in the opposite direction, the balls move to the shallow end of the grooves and engage the inner walls of the cylinder, thus providing a solid connection between the shaft and the cylinder. Triangular-shaped grooves may be machined into a solid disc-shaped member integral with, or fixed to, the shaft, or alternatively, a disc-shaped member may be provided having two or more flat surfaces machined perpendicularly to a radius to define L-shaped portions with washers on either side to contain the balls within the grooves thus formed.

The advantages of the clutch of the present invention will become more understandable from the following description in conjunction with the accompanying figures of the drawing.

BRIEF DESCRIPTION OF THE DRAWINGS

Referring to the drawings.

DESCRIPTION OF THE PREFERRED EMBODIMENTS

Figure 1:
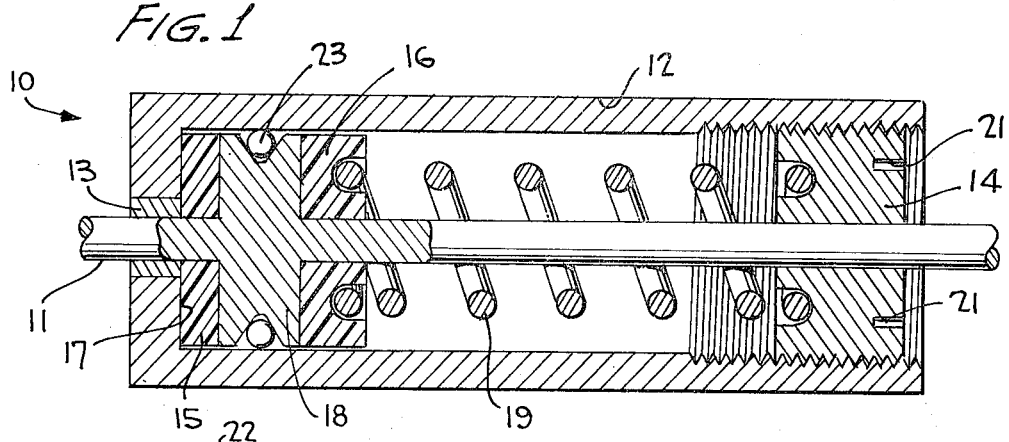
FIG. 1 is a longitudinal section through a unidirectional slip clutch according to one embodiment of the present invention.
Figure 2:
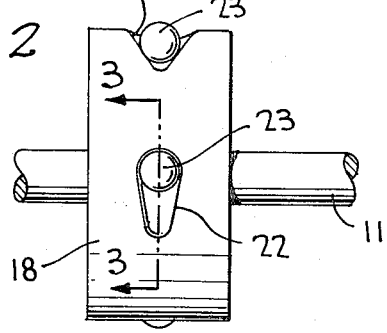
FIG. 2 is a partial elevational view of the shaft and attached disc-shaped member which forms a part of the present clutch.
Figure 3:
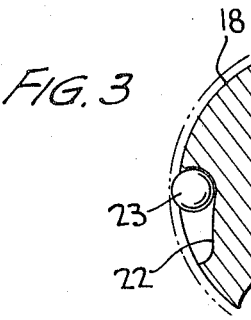
FIG. 3 shows a fragmentary cross-sectional view along lines 3—3 of FIG. 2.

In the embodiment of the present invention shown in FIGS. 1, 2 and 3, a clutch apparatus 10 is provided which includes a shaft 11 and a cylinder 12. Both the shaft 11 and the cylinder 12 are formed of a durable material such as stainless steel. The cylinder 12 rotates freely on the shaft 11 through oilite or self-lubricating bearings 13 and 14. Discs 15 and 16, of Delrin or other similar thermoplastic or suitable metallic construction, are mounted on the shaft 11 to provide friction surfaces between the cylinder inner end wall 17 and a disc-shaped member 18 that is mounted in a fixed position on the shaft 11, or integral therewith, as well as between the member 18 and a spring 19 which is positioned within the cylinder between disc 16 and bearing 14 to provide the necessary tension for the slipping surface to engage or disengage upon the proper amount of torque being applied. Member 18 may be constructed of stainless steel or other similar material.

The bearing 14 is threadedly received in the internal walls of the cylinder 12; thus the bearing 14 may be moved axially within the cylinder 12 by rotating the bearing 14 by means such as a spanner wrench inserted in recesses 21 in the outer surface of the bearing 14.

As shown in FIG. 2, the disc-shaped member 18 is provided with a plurality of peripherally spaced, tapered recesses or grooves 22 in the circumference thereof, the grooves 22 having a shallow portion at one end and a deep portion at the other end of the groove, all the grooves being similarly aligned with regard to the position of the shallow and deep ends. Each groove 22 holds a ball 23 of steel or similar material. The grooves 22 are preferably triangular shaped, as viewed from the side of the disc-shaped member 18, with the shallow portion of the groove being located at the end of the groove which corresponds to the apex of the triangle, as shown in FIG. 3. With the grooves in the shape of a triangle, it has been found that a particularly effective relationship is provided between the ball, the groove and the inner wall of the cylinder with the ball being forced out of the groove as it moves to the shallow end thereof. Thus the narrow sides of the triangle at the shallow end are of assistance in maintaining the ball in a stable position while the ball is in contact with the inner wall of the cylinder. In one embodiment, four such grooves 22 are located around the periphery of member 18, with the grooves being equally spaced at 90 degree intervals around the member 18.

Upon rotating the shaft 11 in the direction such that the deep ends of the grooves 22 represent the leading edges of the grooves, each ball 23 will tend to move toward the shallow end of its respective groove 22 so that the balls engage the inner walls of the cylinder 12, thus providing a solid connection between shaft 11 and cylinder 12 causing rotation of the cylinder with the shaft. Upon rotation of the shaft 11 in the opposite direction, the balls 23 tend to move to the deep end of the grooves 22, so that the balls will not make contact with the inner walls of the cylinder 12. This permits relative rotation between shaft 11 and the cylinder 12. However, such relative rotation will not occur until a threshold torque is surpassed due to the frictional engagement between the disc 15 and the cylinder inner end wall 17. Of course, this threshold torque can be adjusted by modifying the pressure of the spring 19.

From the foregoing description, it is apparent that the subject apparatus may be employed to provide a clutch arrangement in various configurations, depending upon the particular machinery which it is desired to operate. For example, the number of groove and ball combinations provided in the circumference of the member 18 will depend upon the torque being transmitted and the size of the clutch.

Figure 5:
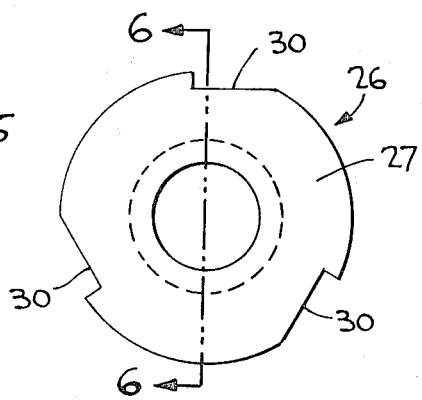
FIG. 5 is an elevational view of an element of the embodiment of FIG. 4.
Figure 6:
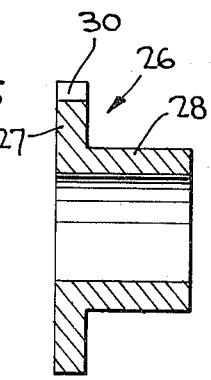
FIG. 6 is a cross-sectional view along lines 6—6 of FIG. 5.
Figure 4:
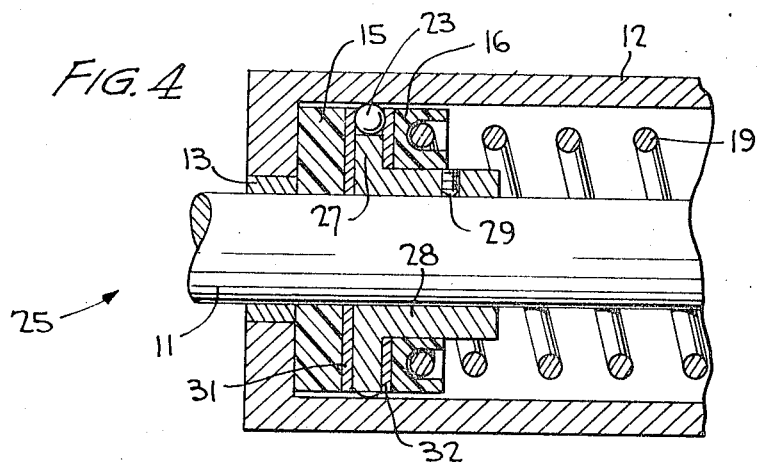
FIG. 4 is a fragmentary cross-sectional view similar to FIG. 1 through a modified embodiment of the clutch of this invention.

A further embodiment of the instant inventive concepts will be seen in FIGS. 4–6 at 25 wherein the basic difference lies in the manner in which the disc-shaped means is constructed. Parts similar to the embodiment of FIGS. 1–3 have been designated by the same reference numeral for ease in understanding. In this embodiment, the disc-shaped means is formed from an element 26 having a disc-shaped portion 27 and a hub 28, the latter being securd to the shaft 11 at a desired location by a set screw 29. The plurality of peripherally spaced flat surfaces 30 are machined perpendicularly to a radius of the disc-shaped portion 27 to define L-shaped portions or grooves, and washers 31 and 32 are positioned on either side thereof to contain the balls 23 within the thus-formed grooves. In this manner, the disc-shaped means is easier to manufacture, although functioning of the embodiment of FIGS. 4–6 is substantially identical with the embodiment of FIGS. 1–3.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

What is claimed is:

1. Apparatus which functions as a unidirectional slip clutch comprising: a shaft; a cylinder mounted in bearings on said shaft; said shaft having fixedly mounted thereon within the cylinder a disc-shaped means having a plurality of peripherally spaced grooves located in the circumference thereof, each groove receiving a ball therein and having a shallow portion at one end of the groove and a deep portion at the other end, the grooves being triangular shaped, with the shallow portion of the groove being located at the end of the groove which corresponds to the apex of the triangle; first and second friction discs mounted on the shaft, said first friction disc being located between the disc-shaped means and one inner end wall of the cylinder, said second friction disc being located on the opposite side of said disc-shaped member; a spring located within the cylinder, one end of said spring engaging said second friction disc, the other end engaging an axially adjustable means carried by said cylinder so that the torque between the shaft and cylinder may be varied by varying the pressure on said spring, said bearings being located on the ends of said cylinder, one of said bearings being threadedly carried at the end of said cylinder remote from said disc-shaped means and defining said axially adjustable means, the threadedly carried bearing being provided with at least one recess in its outer surface for engagement by rotating means.

2. Apparatus which functions as a unidirectional slip clutch comprising: a shaft; a cylinder mounted in bearings on said shaft; said shaft having fixedly mounted thereon within the cylinder a disc-shaped means having a plurality of peripherally spaced grooves located in the circumference thereof, each groove receiving a ball therein and having a shallow portion at one end of the groove and a deep portion at the other end, said disc-shaped means including an element having a disc-shaped portion and a hub portion, means for securing said hub portion to said shaft, said grooves being defined by L-shaped cut-out portions at spaced locations on said disc-shaped portion of said element, one edge of said L-shaped cut-out portions extending perpendicularly to a radius of said disc-shaped portion, and washer members on both sides of said disc-shaped portion; first and second friction discs mounted on the shaft, said first friction disc being located between the disc-shaped means and one inner end wall of the cylinder, said second friction disc being located on the opposite side of said disc-shaped member; a spring located within the cylinder, one end of said spring engaging said second friction disc, the other end engaging an axially adjustable means carried by said cylinder so that the torque between the shaft and cylinder may be varied by varying the pressure on said spring, said bearings being located on the ends of said cylinder, one of said bearings being threadedly carried at the end of said cylinder remote from said disc-shaped means and defining said axially adjustable means, the threadedly carried bearing being provided with at least one recess in its outer surface for engagement by rotating means.

* * * * *